Figure 1:
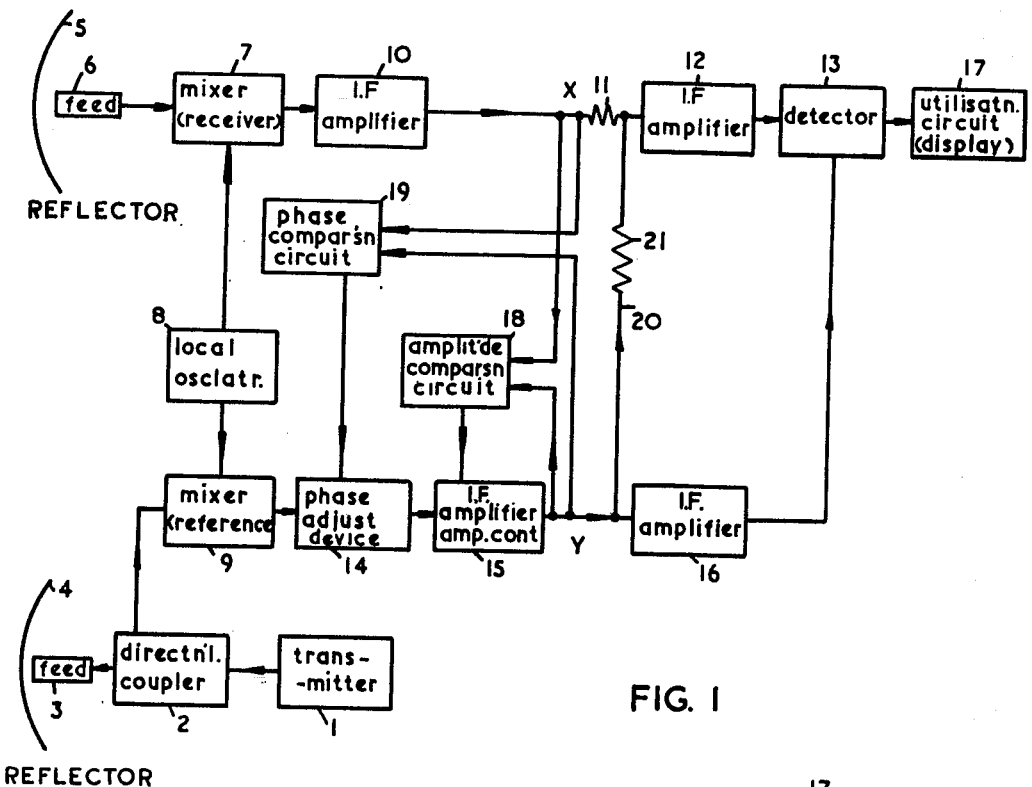

United States Patent
Clare et al.

[15] 3,670,327
[45] June 13, 1972

[54] CONTINUOUS WAVE RADAR SYSTEMS

[72] Inventors: John Dickens Clare; Stanley Bruce Marsh, both of Malvern, England

[73] Assignee: Minister of Supply in Her Majesty's Government of the United Kingdom of Great Britain and Northern Ireland, London, England

[22] Filed: Nov. 1, 1956

[21] Appl. No.: 619,904

[52] U.S. Cl. ............................................................343/8
[51] Int. Cl. .........................................................G01s 9/44
[58] Field of Search..........................................................343/8

[56] References Cited

UNITED STATES PATENTS

| | | | |
|---|---|---|---|
| 483,091 | 9/1892 | Yarington | 72/76 |
| 2,583,573 | 1/1952 | Jaynes | 343/8 |
| 2,147,810 | 2/1939 | Alford | 343/12 |

*Primary Examiner*—T. H. Tubbesing
*Assistant Examiner*—R. Bennett
*Attorney*—Harry M. Saragovitz

EXEMPLARY CLAIM

1. A continuous wave radar system comprising a transmitting channel and a receiving channel, a first heterodying means included in said receiving channel to convert the received signal to an intermediate frequency, a reference signal channel including a second heterodyning means coupled to said transmitting channel for converting a portion of the transmitted signal to an intermediate frequency, phase comparison means coupled to the intermediate frequency outputs of said receiving and said reference channels for producing an output proportional to the phase relationship between the channels, phase adjusting means included in said reference channel and coupled to said phase comparison means for maintaining a fixed phase relationship between channels, amplitude comparison means coupled to the intermediate frequency outputs of said receiving and said reference channels, amplitude adjusting means included in said reference channel and coupled to said amplitude comparison means for maintaining a fixed amplitude relationship between said channels, circuit means for applying a portion of said reference signal to said receiving channel in opposition to cancel the noise component of said received signal, a detector coupled to said receiver channel and to said reference channel to provide an output proportional to the doppler frequency difference between the received signal and the reference signal.

1 Claim, 12 Drawing Figures

INVENTORS
JOHN DICKENS CLARE
STANLEY BRUCE MARSH
By Harry M. Saragovitz
Attorney

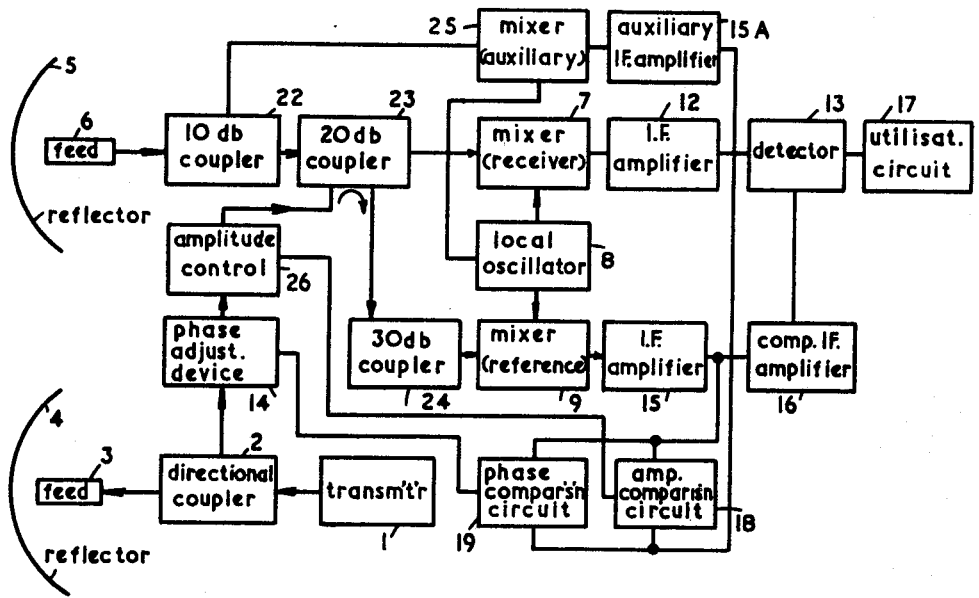
FIG. 2
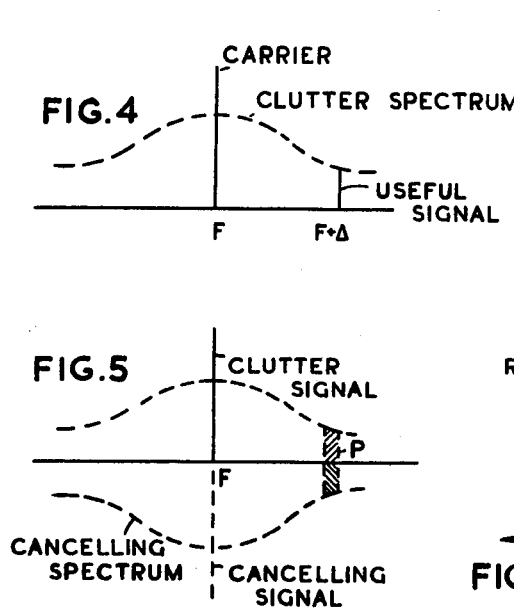
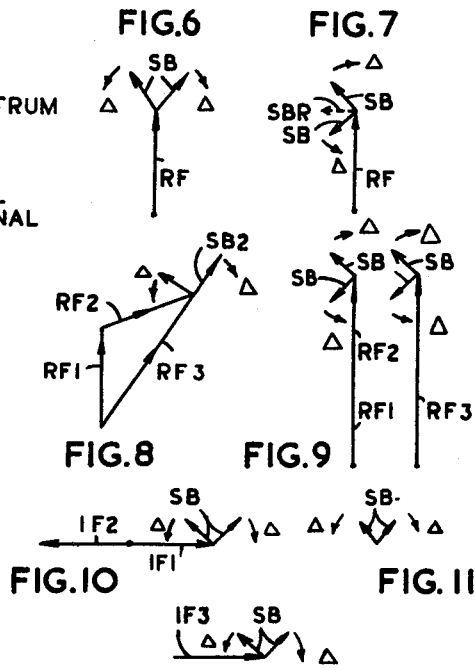
INVENTORS
JOHN DICKENS CLARE
STANLEY BRUCE MARSH
By
Harry M. Saragovitz
Attorney

CONTINUOUS WAVE RADAR SYSTEMS

This invention relates to Continuous Wave (C.W.) radar systems.

In a C.W. radar system a C.W. transmitter is arranged to illuminate a target, reflected waves being received by a receiver in the form of a useful signal at a frequency equal to the sum of the transmitter frequency and a doppler shift frequency; the doppler shift frequency is proportional to and due to the radial velocity of the target, that is, the velocity along a line joining the receiver and the target. Other useful signals due to other targets will be present at frequencies correspondingly spaced from the transmitted frequency according to the velocities of those targets.

So-called clutter or noise signals are also present at the receiver; these signals typically are noise-modulated signals, of fundamental frequency equal to that of the transmitter, which can mask the desired signals and prevent their detection.

It is an object of the invention to provide a C.W. radar system in which the effect of clutter signals is reduced.

According to the invention therefore a continuous wave radar system comprises a receiver for receiving signals reflected from a reflecting body which is illuminated by radiation from a continuous wave transmitter, having a detector for detecting the doppler frequency difference between a received signal and a reference signal derived from the transmitter to provide an output signal indicative of the radial velocity of the reflecting body, means for deriving from the transmitter a cencelling signal having a fundamental frequency related to that of the transmitter and equal to that of the received signal at some point in the receiver, the noise spectrum of the derived signal corresponding to that of the transmitter, means for feeding the cancelling signal into the receiver in opposition to the received signal and at the same fundamental frequency, and means for ensuring that the derived cancelling signal is equal in amplitude and in fixed phase relation to the received signal, whereby substantial cancellation of an amplitude modulated component of the clutter signal is achieved.

It can be shown that a clutter signal can carry either amplitude modulation or frequency modulation, or both; and where, as it will be in many cases, the frequency modulation component of the clutter signal is an important factor in preventing the detection of the desired doppler signal it is desirable to be able to reduce this component.

In C.W. radar systems the detector is a device for detecting the frequency difference between two signals and utilizes a signal derived from the transmitter to act as a reference against which a doppler frequency shift of a received signal can be detected. To reduce the frequency modulated component of the clutter signal the reference signal and the fundamental frequency component of the received signal are maintained in phase or anti-phase at the detector.

Figure 3:
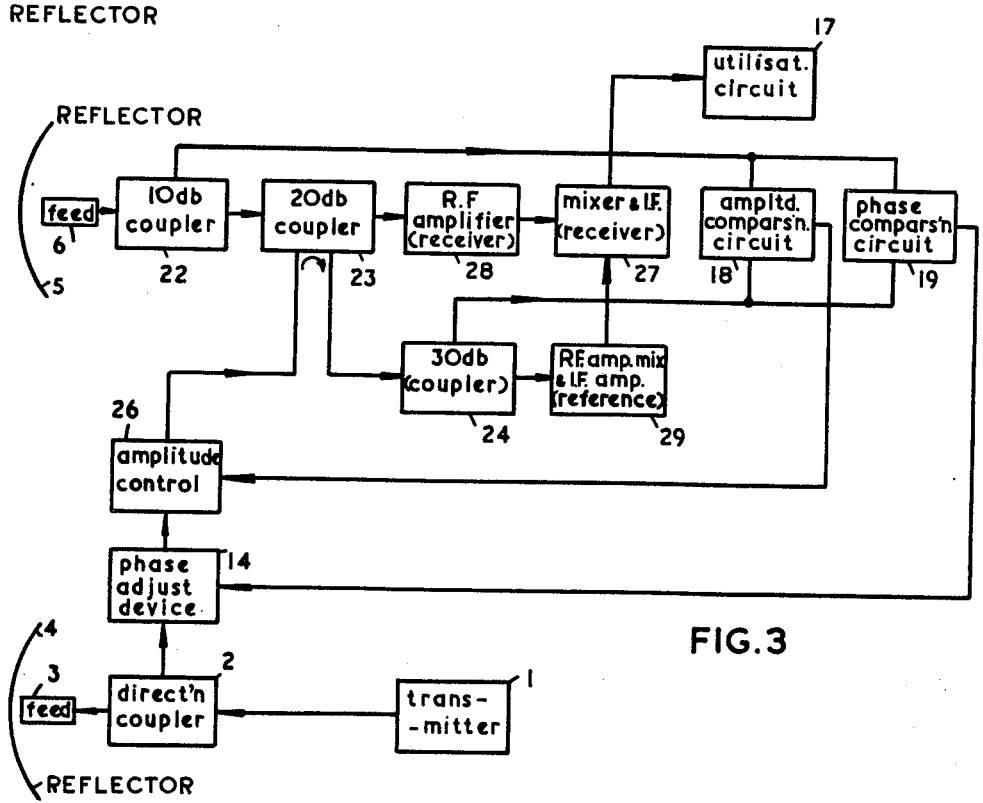

In order to make the invention clearer the nature of clutter signals in C.W. radar systems will now be discussed and examples will be described of C.W. radar systems providing cancellation of amplitude and frequency modulated clutter signals. Reference will be made to the accompanying drawings in which:

FIGS. 1, 2 and 3 show block schematic diagrams of C.W. radar systems providing cancellation of amplitude and frequency modulated clutter signals, FIGS. 4 and 5 are graphs useful in understanding clutter signal cancellation, and FIGS. 6, 7, 8, 9, 10, 11 and 12 are some vector diagrams involved in clutter signal cancellation.

When a reflecting object is illuminated by radiation from a continuous wave transmitter a reflected signal, which can be received by a suitable receiver, will be found to consist of two parts — a useful part at a frequency equal to the sum of the transmitter frequency F and a doppler shift frequency $\Delta$ due to the radial velocity of the reflecting object, and a second, non-useful part known as clutter, or noise signal; this second part will be at a fundamental frequency equal to the transmitter frequency F but will be amplitude and frequency modulated due to amplitude and frequency variations in the transmitter output. This part will include unwanted reflections, of the noise modulated waves from the transmitter, by surrounding objects and also direct leakage between the aerials.

If a receiver using beat reception in which the incoming signal is applied, for example, to an envelope following detector, together with a reference signal derived from the transmitter, is considered it would appear at first sight that the useful signal, the signal exhibiting the doppler shift, $(F + \Delta)$ could be separated from the clutter signal at frequency F by means of a tuned filter. In actual practice however, the spectrum of the clutter signal extends over the band within which the doppler signal can be expected to come and the clutter signal can be large enough in its spectrum to mask the useful signal. This situation is illustrated in FIG. 4 which shows a fundamental transmitter carrier of frequency F and the useful signal at a frequency $F + \Delta$, together with a spectrum of a clutter signal designated CLUTTER SPECTRUM and shown in dotted line.

The clutter signal is made up of an amplitude modulated component and a frequency modulated component; the spectrum of each component is similar to that shown by the dotted line. It is desirable therefore, if the chance of detecting the useful signal is to be kept high, to reduce the magnitude of clutter signal due to this spectrum so that it no longer tends to mask the useful signal.

It is convenient to consider reduction of the amplitude modulated component of the clutter signal first and to consider the frequency modulated component later.

It has been realized that the amplitude modulated component of the clutter signal due to a given transmitter can be defined by reference to its magnitude at the fundamental frequency F of the transmitter; in other words with reference to FIG. 5, if the fundamental frequency F of the clutter signal is determined as shown, a clutter spectrum due to amplitude modulation will also be determined and will extend as shown by the dotted line. In particular, the magnitude of the part P of this clutter spectrum which could mask a useful signal of frequency $F + \Delta$ is dependent upon the magnitude of the clutter signal at fundamental frequency. It is therefore proposed to cancel the part P by applying at the detector of the receiver a clutter cancelling signal which is derived from the transmitter, and has a magnitude at the fundamental frequency F equal to that of the clutter signal at the same frequency F but is in opposition to it. Then not only does the cancelling signal cancel the clutter signal at the fundamental frequency F but it provides a cancelling spectrum, so to speak, which cancels the clutter spectrum over that part likely to mask useful signals.

Part of the clutter signal is obtained from reflections from objects at a distance from the transmitter; an object, say 100 yards away, will contribute to the clutter signal at fundamental frequency F and also to the clutter spectrum. However, a component of the clutter spectrum spaced at say 1 KC per second from the frequency F will only differ in phase, by virtue of reflection at 100 yards distance, by 0.2° from the corresponding part of the cancelling spectrum derived from the transmitter, in which reflection causes no phase change. Over a reasonably wide clutter spectrum therefore it will be possible to give effective clutter cancellation to prevent masking of useful signals.

It is the amplitude modulated component of the clutter signal which has been discussed above and there can also exist a frequency modulated component of the clutter signal, its spectrum of shape similar to that of the amplitude modulated clutter spectrum. The frequency modulated clutter spectrum has the same general shape as the clutter spectrum shown in FIG. 4. At a given frequency the frequency modulated clutter signal can be represented by the vector diagram shown in FIG. 7 where the fundamental frequency vector RF carries two side-band vectors SB rotating in opposite senses at the doppler frequency $\Delta$ but having a resultant SBR at right angles to the radio frequency vector RF. It is of interest, at this stage, to compare this vector diagram with that of FIG. 6 which shows a vector diagram of an amplitude modulated clutter signal; there the fundamental frequency vector RF carries two side band vectors SB which rotate in opposite directions at the doppler frequency $\Delta$; the resultant of the side-band vectors is in line with the vector RF.

Consider again a detector of the envelope following type referred to above; it will be appreciated that a frequency modulated clutter signal incident on such a detector will not give rise to any output. Neither will two such signals if the frequency modulations are synchronized. However, if there is a time delay between two such signals, due for instance to one signal being a reflected signal from a distant object and the other a reference signal derived from a transmitter, the frequency variations will no longer be synchronized and the resultant RF vector of the two signals on the detector will carry noise modulations.

This is shown in FIG. 8 where the addition of two frequency modulated RF vectors RF1 and RF2 having a phase difference between them is shown. The frequency modulation of the two vectors is shown for convenience as relative to the RF vector RF2 only. The resultant vector RF3 carries a noise modulation represented by the side band vectors SB1 and SB2. It will be appreciated that in general there will be an amplitude modulation component which, of course, will appear as an unwanted signal in the output of an envelope following detector.

Now, in the case where the radio frequency phase of two signals on an envelope following detector is the same, there is no noise signal in the output of the detector even though there has been a time delay difference between the two signals at some previous stage. This is shown in FIG. 9 where two vectors RF1 and RF2 are in phase and are added together to give a resultant vector RF3 which carries only a frequency modulation pair of vectors and no amplitude modulation vectors; hence no noise signal will result in the output of the detector. It follows therefore that the noise signal output from the detector is a function of both the RF phase of two signals incident upon the detector and the time delay difference between the side band vectors of any frequency modulated clutter signal.

If therefore the reference signal at the detector is maintained in phase with the phase of the noise signal the necessary conditions for reduction of frequency modulated clutter signal are present; that is, the two RF vectors representing the signals (reference and clutter) on the detector are in phase and no noise appears in the detector output.

Although the above discussion relates to clutter signal cancellation at radio frequency it should be noted that the same principles are applicable to cancellation at so-called intermediate frequency where the relative phase characteristics of radio frequency signals are preserved after a translation to a new (intermediate frequency in the case of super-heterodyne working) frequency.

In FIG. 1 is shown schematically a continuous wave radar system in which cancellation of both amplitude and frequency modulation clutter signals is arranged to take place at intermediate frequency. A transmitter 1 feeds via a directional coupler 2 to an aerial system shown diagrammatically as an aerial feed 3 and a reflector 4. A second reflector 5 and aerial feed 6 constitute a receiving aerial which feeds to a receiver mixer 7. A local oscillator 8 feeds the mixer 7 and also feeds a second reference mixer 9; the mixer 9 receives a reference signal bled from the transmitter feed by the directional coupler 2. The output from the receiver mixer 7 feeds via an IF (Intermediate Frequency) amplifier 10 and a resistor 11 to a second IF amplifier 12 and thence to the signal input of an envelope following diode detector 13.

The reference mixer 9 feeds via a phase adjust device 14 and an amplitude-controlling IF amplifier 15 via another IF amplifier 16 to the reference input of the detector 13 so providing a reference signal. A convenient display or utilization circuit 17 is fed from the detector 13.

An amplitude comparison circuit 18 is connected to compare signals between corresponding points X and Y of the IF amplifier chains, the points X and Y being taken at the outputs of the amplifiers 10 and 15 respectively. The amplifier comparison circuit 18 controls the gain of the amplifier 15 so as to equalize the amplitude of the signals at the points X and Y.

Also, a phase comparison circuit 19 is connected at the points X and Y to compare the phase between these two points. The phase comparison circuit 19 controls the phase adjust circuit 14 to maintain equality between the phases at the points X and Y.

A cancelling path 29 is provided between the output of the amplifier 15 to the input of the amplifier 12 through a resistor 21.

In operation, a moving reflecting object is illuminated by radiation from the transmitter 1 which is directed to the object from the aerial feed 3 by the reflector 4; reflected signals are received at the reflector 5 and the aerial feed 6 and feed into the receiver mixer 7. The received signals comprise a signal at a frequency equal to the frequency F of the transmitter 1 plus a frequency $\Delta$ due to the doppler shift in the radiations reflected from the moving object, and a clutter signal centred about the transmitted frequency F. In the mixer 7 these two signals are both reduced to intermediate frequency signals and pass through the IF amplifier 10 via the resistor 11 to the input of the amplifier 12. From the amplifier 12 the signals are passed to the envelope following detector 13.

The envelope following detector 13 requires a reference signal of intermediate frequency which is locked to the transmitter frequency. This is provided by the directional coupler 2 which bleeds a small part of the transmitter output into the mixer 9 where it is reduced to intermediate frequency and passed through IF amplifiers 15 and 16 via the phase control circuit 14 to act as a reference signal for the detector 13.

To provide cancellation of the amplitude modulation component of the clutter signal as discussed previously it is necessary to feed into the circuit carrying the received signal a cancelling signal derived from the transmitter. This is provided as follows: the reference signal 1 bled from the transmitter 1 by the directional feed 2 is controlled as to phase and amplitude by the phase adjust device 14 and the amplitude controlling IF amplifier 15 which are respectively controlled by the phase comparison circuit 19 and the amplitude comparison circuit 18. The result is that there is a signal at the point Y which is in anti-phase to the clutter signal at the point X and hence at the input to amplifier 12. The cancellation path 20 provides the necessary feed of the cancelling signal to the received signal circuit for cancellation of the amplitude modulated component of the clutter signal.

The circuit of FIG. 1 also deals with the frequency modulation component of the clutter signals; to this end it is arranged that the anti-phase condition, once it is set up between the points X and Y, is preserved right up to the signal and reference inputs to the detector 13. This means that the previously discussed conditions for the cancellation of the frequency modulation component of the clutter signal obtain.

The cancellation of the frequency modulation component of the clutter signal in this circuit is illustrated in FIGS. 10, 11 and 12. In FIG. 10 the intermediate frequency vector IF1 carries frequency modulated clutter side-band vectors SB which, of course, have a resultant perpendicular to the intermediate frequency vector IF1. A cancelling signal represented by a second intermediate frequency vector IF2, cancels the intermediate frequency signal represented by fector IF1 to leave a zero vector having frequency modulated clutter side band SB as shown in FIG. 11. The vectors SB of FIG. 11 thus represent the frequency modulation component of the clutter signal at the signal input to the detector 13. Now the addition of an intermediate frequency reference vector to the side-band vectors SB of FIG. 11, which occurs in the envelope following detector 13 when the reference signal is added, is shown in FIG. 12; a reference vector IF3 is added to the vectors SB and, by virtue of the amplitude modulation cancellation already described, is in phase with the original clutter signal vector IF1; the reference vector IF3 is thus at right angles to the resultant of the side-band vectors SB, and this means that the modulation present at the detector 13 is frequency, not amplitude modulation; no noise due to these sidebands SB is therefore detected by the amplitude following detector 13.

It will be appreciated moreover that it is immaterial whether the vector IF3 is in phase or in antiphase with the original clutter signal vector RF1. In either conduction the resultant of the frequency modulated side band vectors SB is perpendicular to the vector IF3.

The amplitude and phase comparison circuits 18 and 19 of FIG. 1 may be of any suitable design.

In the introductory discussion above the question of clutter cancellation has been related to radio frequency; the example described above relates to clutter cancellation in which amplitude and phase comparison and control are at intermediate frequency and, in certain circumstances it may be advantageous to perform the amplitude and phase comparison at intermediate frequency and the control and cancellation at radio frequency; for instance, where it is desired to avoid overload of mixer crystals. Accordingly therefore an arrangement such as that shown in FIG. 2 can be used in which the control and the cancellation are performed at radio frequency while the amplitude and phase comparison are performed at intermediate frequency.

In the arrangement of FIG. 2 a transmitter 1 feeds via a directional coupler 2 to a reflector 4 via an aerial feed 3. A receiving reflector 5 feeds via an aerial feed 6 to a receiver mixer 7 via the through arms of a 10 db coupler 22 and A 20 db coupler 23. The directional coupler 2 feeds via phase adjust device 14 and an amplitude control circuit 26 via a through arm of the 20 db coupler 23 and via the 30 db coupled parallel arms of a 30 db coupler 24 to the mixer 9. The mixers 7 and 9 are fed by a common local oscillator 8. An amplitude comparison circuit 18 controls the amplitude control circuit 26 and the phase comparison circuit 19 controls the phase adjust device 14. The phase and amplitude control circuits 18 and 19 compare signals fed from the IF amplifier 15 for the reference signal and from an auxiliary IF amplifier 15A, which is fed from an auxiliary mixer 25, for the receiver signal. The mixer 25 derives a signal from the receiving aerial feed 6 via the 10 db arm of the 10 db coupler 22 and obtains a local oscillation from the local oscillator 8. The outputs of the IF amplifiers 12 and 15 feed as before to an envelope following detector 13 which itself feeds to a utilization circuit 17. A compensating IF amplifier 16 is inserted in between the amplifier 15 and the reference input to the detector 13 to compensate for any inequality between the gain of IF amplifiers 12 and 15.

In operation the transmitter 1 feeds through the directional coupler 2 and the aerial system 3, 4 to illuminate desired moving objects. Reflected waves from the target are received by the reflector 5 and pass via the aerial feed 6 to the receiver mixer 7; intermediate frequency signals pass from the mixer 7 to the detector 13 where the doppler frequency signals is extracted and passed to the utilization circuit 17 substantially as described before.

Again amplitude and phase comparison are performed at intermediate frequency by the amplitude and phase comparison circuits 18 and 19 fed from the intermediate frequency amplifiers 15 and 15a. The received clutter signal is fed to the comparison circuits 18 and 19 via the 10 db arm of the 10 db coupler 22; at the mixer 25 it is reduced to intermediate frequency and passed to the intermediate frequency amplifier 15a. The cancelling signal, the reference signal in this case, is fed to the comparison circuits 18 and 19 via the directional coupler 2, the amplitude and phase control circuits 26 and 14, a parallel arm of the directional coupler 23 and through the 30 db coupler 24 and the reference mixer 9.

Phase and amplitude control of the cancelling signal are performed at radio frequency by virtue of the placing of the amplitude and phase control circuits 26 and 14 in the radio frequency connection between the directional coupler 2 and the parallel arm of the directional coupler 23. The directional coupler 23 acts as a 20 db coupler to the received signal circuit to the receiver mixer 7 and serves to inject the phase and amplitude controlled cancelling signal into the receiving part of the circuit so as to effect cancellation of amplitude modulated clutter signal at radio frequency.

FIG. 3 shows yet another arrangement in which both comparison and control of phase and amplitude as well as clutter cancellation, are performed at radio frequency. The arrangement is similar in some respects to that of FIG. 2 except that the amplitude and phase comparison circuits 18 and 19 are fed from the 10 db and 30 db couplers 22 and 24 respectively; these couplers operate at radio frequency. The amplitude and phase control circuits 26 and 14 also operate at radio frequency as in the arrangement of FIG. 2. Other corresponding parts of the two arrangements are numbered similarly but in the arrangement of FIG. 3 the receiver mixer, IF and detector stages are shown generally by a rectangle 27 which feeds to the display circuit 17. The radio frequency input to the mixer and subsequent stages 27 is fed through a radio frequency amplifier 28 from the 20 db coupler 23 and reference radio frequency, mixer and IF stages generally designated by a rectangle 29 provide an IF reference signal for the detector of the stages 27.

It will be appreciated that, by suitable choice of the reference and signal paths, in both the arrangements of FIG. 2 and 3 it can be arranged that the reference and clutter signals at the detector B are in phase and hence the conditions for frequency modulated clutter cancellation as well as amplitude modulated clutter cancellation obtain.

Although the arrangements of FIGS. 1, 2 and 3 have been described as using envelope following diode detectors, balanced phase sensitive detectors may be used without altering the essential principles of operation of the circuits.

We claim:

1. A continuous wave radar system comprising a transmitting channel and a receiving channel, a first heterodying means included in said receiving channel to convert the received signal to an intermediate frequency, a reference signal channel including a second heterodyning means coupled to said transmitting channel for converting a portion of the transmitted signal to an intermediate frequency, phase comparison means coupled to the inter-mediate frequency outputs of said receiving and said reference channels for producing an output proportional to the phase relationship between the channels, phase adjusting means included in said reference channel and coupled to said phase comparison means for maintaining a fixed phase relationship between channels, amplitude comparison means coupled to the inter-mediate frequency outputs of said receiving and said reference channels, amplitude adjusting means included in said reference channel and coupled to said amplitude comparison means for maintaining a fixed amplitude relationship between said channels, circuit means for applying a portion of said reference signal to said receiving channel in opposition to cancel the noise component of said received signal, a detector coupled to said receiver channel and to said reference channel to provide an output proportional to the doppler frequency difference between the received signal and the reference signal.

* * * * *